United States Patent Office 2,793,100
Patented May 21, 1957

2,793,100

PROCESS OF MODIFYING CARBON BLACK

Adolf Weihe, Kronberg (Taunus), Hesse, Germany, assignor to Deutsche Gold- und Silber-Scheideanstalt vormals Roessler, Frankfurt am Main, Germany, a corporation of the Federal Republic of Germany No Drawing. Application October 8, 1953,
Serial No. 385,021

Claims priority, application Germany October 16, 1952

2 Claims. (Cl. 23—209.1)

This invention comprises a novel process of treating carbon black to improve its coloring properties and thus increase its efficacy as a component of printing inks, paint and the like.

Carbon black is commonly employed in two fundamentally different fields of application. The quantitatively more important field is to be found in the rubber industry, where substantial amounts of carbon black are added to rubber in order to improve its mechanical properties, such as resistance to abrasion, modulus, etc. to meet practical requirements demanded for automobile tires. It is well known that the commercially important synthetic rubbers, for example, the mixed polymerizates of butadiene and styrene (Buna S) are rendered industrially useful only by incorporating certain blacks therein. Such carbon blacks are generally termed active carbons, with reference to their property of favorably affecting the mechanical properties of vulcanized rubber.

Another important application of carbon black is based on its black coloration. For paints, varnishes, carbon paper, ribbons and printing inks, blacks of high color intensity, ready dispersibility in oils, low oil consumption and minimum thixotropy of pastes are required. Coloring blacks now available on the world market are characterized by high volatile content (about 8%), evidently due to an oxidizing treatment.

It has now been found that even such carbon blacks as have been obtained from normally non-gaseous higher-boiling-point hydrocarbon fractions, for example, coal tars such as naphthalene sludge, anthracene oil, carbazolic anthracene residues, residues from petroleum refining and the like, whose processing for varnish and printing ink purposes involves considerable difficulty, can be converted into high-grade coloring blacks without substantially altering their chemical composition, if they are exposed, in aqueous dispersion, to reactions that proceed with vigorous evolution of gases through the entire aqueous dispersion. I have discovered that the activity of the treated carbon black is thereby largely eliminated, and that at the same time no loss of substance occurs in the course of this treatment.

The kind of reaction and the nature of the gas evolved are not of critical importance in this effect so long as the evolution of gas takes place throughout the whole aqueous dispersion and so is effective in respect to all of its carbon black component. If active gases are formed, as for example nitrous oxide, chlorine, nitrogen dioxide or the like, there may be a chemical side reaction with the carbon, as is analytically verifiable. In general, however, there is apparently primarily a physical effect, presumably a splitting of larger aggregates, whereby the properties of the carbon blacks are substantially modified.

Examples of such reactions are the following:

(1) $NH_4NO_2 = N_2 + 2H_2O + 71.8$ cal.

The ammonium nitrite may be conveniently produced by the action of hydrogen peroxide on ammonia in highly dilute aqueous solution. Preferably, the carbon black may be treated with ammonia and then with hydrogen peroxide, and the mixture heated, whereupon the formulated reaction proceeds rapidly.

(2) A still more vigorous reaction is effected by the decomposition of urea nitrite into nitrogen, water and carbon dioxide, by the following equation:

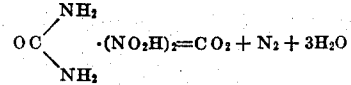

This reaction may also be so conducted that no electrolytes are left behind in the carbon black, this being of considerable importance in the production of high-grade coloring blacks.

(3) Satisfactory results may be effected by the decomposition of diazo compounds, preferably aliphatic, for example, when carbon black is heated in water with azoisobutyronitrile. The resulting evolution of nitrogen evidently has the same effect as the reaction described above under paragraph (1).

(4) Hydroxyl amine and its salts may likewise be used to exert the desired effect on carbon black, for example as in the following equation:

$$HO \cdot NH_2 \cdot ONOH = N_2O + 2H_2O$$

A similar effect may be derived from the decomposition of hypochlorous acid. However, this reaction requires a thorough washing out of the electrolyte and is therefore less advantageous in application than those described under paragraphs (1) to (4).

After treatment of the suspended carbon black as above outlined the black may be separated from its water of suspension in any desired manner, as by drying under partial vacuum.

To illustrate the effects of the procedure described, analytical data on various carbon blacks before and after treatment is here presented.

*Elementary analysis after drying under vacuum at 70° C.*

|  | Percent C | Percent H | Percent N | Percent O | Percent S |
|---|---|---|---|---|---|
| Coloring black from naphthalene sludge | 95.25 | 0.94 | 0.16 | 2.38 | 0.51 |
| Same treated per (1) | 94.16 | 1.05 | 0.18 | 2.83 | 0.20 |
| Coloring black from anthracene oil | 95.61 | 1.09 | 0.10 | 1.96 | 0.37 |
| Same after treatment | 94.07 | 1.20 | 0.22 | 2.87 | 0.30 |
| Coloring black from anthracene oil plus anthracene residues | 95.71 | 0.86 | 0.13 | 2.12 | 0.29 |
| Same treated per (1) | 95.39 | 0.95 | 0.22 | 2.67 | 0.23 |

Remarks: Combustion at 800°. Oxygen was determined directly. Difference from 100% is due to content of inorganic components volatilized at 800°. The ash content is about 0.05¼.

It is evident that the subsequent treatment does not produce any substantial change in composition.

By way of further data, the values of a carbon black treated according to (3), i. e. with an aliphatic azo compound, are found to be:

|  | Percen C | Percen H | Percen N | Percen O | Percent S |
|---|---|---|---|---|---|
| Coloring black from anthracene oil | 94.95 | 0.90 | 0.10 | 2.87 | 0.50 |
| Same after treatment | 91.63 | 1.42 | 2.49 | 3.75 | 0.26 |

The following table shows viscosimetric data of carbon blacks before and after treatment according to the present invention. They were ground in this instance with 10 times the quantity of varnish linseed oil, in a high-speed three-roller mill. Each bath was passed through the mill three times.

The measurements were performed with a Drage Torsion Viscosimeter. The design of this viscosimeter permits a thixotropy rating by determining the resistance encountered by the rotor when revolving in the batch at the beginning of the observation and, for example, after 10 minutes. The farther the initial from the final value of the observation, the greater the thixotropy.

The absolute magnitude of the viscosity in centipoises is a relative measure of the oil consumption of the carbon black. The following table is illustrative.

*Viscosity of carbon blacks ground with 10 times the quantity of linseed oil, in centipoises*

|  | 2 hrs. | 24 hrs. | 4 days | 7 days | 11 days |
|---|---|---|---|---|---|
|  | After Grinding ||||| 
| FW 1 coloring black: |  |  |  |  |  |
| Beginning of test | 11,300 | 5,500 | 6,200 | 3,200 | 4,450 |
| After 10 min | 4,200 | 4,150 | 2,950 | 2,400 | 3,880 |
| Same after treatment: |  |  |  |  |  |
| Beginning of test | 3,070 | 1,585 | 1,480 | 1,210 | 1,110 |
| After 10 min | 980 | 960 | 750 | 990 | 975 |
| Regent coloring black: |  |  |  |  |  |
| Beginning of test | 8,100 | 6,500 | 7,800 | 7,750 | 7,540 |
| After 10 min | 2,700 | 1,700 | 3,000 | 3,450 | 3,700 |
| Same after treatment: |  |  |  |  |  |
| Beginning of test | 3,850 | 1,820 | 3,740 | 3,170 | 2,680 |
| After 10 min | 1,320 | 1,270 | 1,780 | 1,780 | 1,710 |
| S 170 coloring black: |  |  |  |  |  |
| Beginning of test | 11,000 | 7,100 | 6,200 | 4,900 | 5,160 |
| After 10 min | 6,100 | 6,000 | 4,550 | 3,650 | 3,670 |
| Same after treatment: |  |  |  |  |  |
| Beginning of test | 1,730 | 1,450 | 1,110 | 1,065 | 970 |
| After 10 min | 1,030 | 1,035 | 880 | 770 | 775 |
| Printex coloring black: |  |  |  |  |  |
| Beginning of test | 900 | 626 | 635 | 616 | 552 |
| After 10 min | 598 | 525 | 477 | 435 | 382 |
| Same after treatment: |  |  |  |  |  |
| Beginning of test | 290 | 210 | 255 | 234 | 219 |
| After 10 min | 179 | 169 | 165 | 168 | 153 |

The several rows of the table show that treatment according to the present invention:

1. Sharply reduces the viscosity of 1:10 carbon black in linseed oil, and hence diminishes oil consumption.

2. Reduces thixotropy as rated from the difference between the initial and final observation in the rotary viscosimeter.

3. Flattens out the variation of values within a given series of observations. In this regard it is notable that the values vary far less with duration of storage: in the case of some varieties, the values for the treated carbon blacks lie within the margin of error of the measurement. These are industrial advantages.

Similar measurements have been obtained for the same carbon blacks ground with other binders, for example with lean, semi-fat and fat oil varnishes, with alkyd resin varnishes of various compositions, and with crushed compounds containing nitrocellulose and softeners as binders (so-called "chips"). In all cases, the findings are similar. In a mixture of olive oil and neat's foot oil, such as is commonly used in the manufacture of ribbons, untreated blacks were found to undergo a remarkably sharp increase in viscosity of 10% mixtures upon storage, so that they were no longer satisfactory for practical purposes. The treated blacks behaved satisfactorily; as a rule, in fact, they showed a slight decrease in viscosity with increasing duration of storage.

In grinds of untreated carbon black with nitrocellulose and softeners, the solutions showed marked increase in viscosity after only a few days, and even high dilution of the solutions, for example with butyl acetate, failed to yield high-gloss coatings. After a few weeks, poured applications also showed specks and grains due to agglomeration of carbon particles, and brushed or poured coatings blistered when repeated; the areas with several coats became loose and rough. None of these defects were exhibited by the treated blacks. This represents a substantial and valuable advance in the art.

Illustrative examples of the process of this invention are set forth as follows:

*Example 1.*—In an agitator vessel of 1000 liters capacity, 50 kg. of a carbon black (Regent) prepared from a mixture of anthracene oil and anthracene residue was added to 500 l. water, to which 12.5 kg. 30% aqueous ammonia had been added. After the black was uniformly distributed, 15 kg. 30% hydrogen peroxide was added with continuous agitation. This was heated with continued agitation for ½ hour to 80° and kept at that temperature for 2 hours, then was allowed to cool to 40° and water was removed on a suction filter. The moist carbon black was dried in a drying drum to about 1–2% moisture.

*Example 2.*—In an agitator vessel as described in Example 1, 250 liters water mixed with 0.5 kg. sodium methylnaphthalenesulfonate; when the wetting agent had been completely dissolved, 25 kg. of an active carbon (CK III) used in the rubber industry was introduced and dispersed, then 3.7 kg. 30% ammonia and 3.9 kg. 30% hydrogen peroxide were added. Vigorous foaming set in, which was further intensified by heating to 75° C. The temperature was maintained at 75° for 3 hours, and the mixture was then allowed to cool within 5 hours. Finishing is effected on a screenless centrifuge, with subsequent drying in a vacuum oven at 60°.

*Example 3.*—In 1000 parts water, 100 parts coloring black from anthracene oil (Regent) were introduced and vigorously agitated. The mixture was treated with 20 parts azoisobutyronitrile and heated to 90° within 30 minutes. This resulted in a vigorous evolution of gas. After heating for 2 hours, decomposition of the azo compound was completed. The mixture was filtered through a Buchner funnel on filter paper, washed twice with water and dried at 100°. The product is fully equivalent industrially to that produced according to Example 1.

It is within the scope of the present invention to charge the carbon black first with a substance which subsequently reacts with a later added reagent with evolution of gas. In such variant of my novel process the sub-division of any agglomerates of carbon particles is advantageously favored.

Having thus disclosed my invention and described in detail illustrative examples of its practice, I claim as new and desire to secure by Letters Patent:

1. A process of producing high-grade coloring blacks, which comprises the steps of subjecting carbon black uniformly distributed in aqueous dispersion to physical disintegration of the larger aggregates of carbon black particles by gases evolved by chemical decomposition due to heating of a gas-generating reagent dissolved in aqueous phase of the dispersion, said gas-generating reagent being selected from the group consisting of ammonium nitrite, urea nitrite, aliphatic diazo compounds and hydroxyl amine.

2. A process for the production of high-grade coloring blacks, which comprises the steps of exposing carbon black uniformly distributed in aqueous dispersion to the effect of gases evolved by the decomposition of ammonium nitrite in the aqueous solution upon heating.

References Cited in the file of this patent

UNITED STATES PATENTS

| | | |
|---|---|---|
| 2,420,810 | Bray et al. | May 20, 1947 |
| 2,439,442 | Amon et al. | Apr. 13, 1948 |
| 2,641,533 | Cines | June 9, 1953 |